United States Patent
Yu et al.

(10) Patent No.: US 10,383,122 B2
(45) Date of Patent: Aug. 13, 2019

(54) DYNAMIC SHARING OF OFDMA AND ATDMA SIGNALS

(71) Applicant: Casa Systems, Inc., Andover, MA (US)

(72) Inventors: Tao Yu, Andover, MA (US); Douglas Keith Rosich, North Reading, MA (US); Weidong Chen, Boxborough, MA (US)

(73) Assignee: Casa Systems, Inc., Andover, MA (US)

( * ) Notice: Subject to any disclaimer, the term of this patent is extended or adjusted under 35 U.S.C. 154(b) by 0 days.

(21) Appl. No.: 15/728,916

(22) Filed: Oct. 10, 2017

(65) Prior Publication Data

US 2018/0263037 A1    Sep. 13, 2018

Related U.S. Application Data

(60) Provisional application No. 62/468,713, filed on Mar. 8, 2017.

(51) Int. Cl.
| | |
|---|---|
| *H04B 7/26* | (2006.01) |
| *H04L 5/00* | (2006.01) |
| *H04L 25/02* | (2006.01) |
| *H04L 27/00* | (2006.01) |
| *H04L 27/26* | (2006.01) |
| *H04L 27/38* | (2006.01) |

(Continued)

(52) U.S. Cl.
CPC ........... *H04W 72/0453* (2013.01); *H04J 4/00* (2013.01); *H04L 5/0007* (2013.01); *H04L 25/02* (2013.01);

(Continued)

(58) Field of Classification Search
CPC .. H04B 7/2615; H04B 7/2618; H04B 7/2671; H04L 5/0007; H04L 27/0008;

(Continued)

(56) References Cited

U.S. PATENT DOCUMENTS

| | | | | |
|---|---|---|---|---|
| 5,243,299 A | * | 9/1993 | Marchetto | H04L 27/1566 |
| | | | | 329/300 |
| 6,535,553 B1 | * | 3/2003 | Limberg | H04L 27/01 |
| | | | | 348/614 |

(Continued)

OTHER PUBLICATIONS

International Search Report and Written Opinion dated May 21, 2018 in connection with International Application No. PCT/US2018/021251.

*Primary Examiner* — Young T Tse
(74) *Attorney, Agent, or Firm* — Wolf, Greenfield & Sacks, P.C.

(57) ABSTRACT

The techniques described herein relate to methods, apparatus, and computer readable media configured to decode modulated data. A modulated signal is received. A format of the modulated signal is determined, wherein the format can include a first format comprising a first type of modulated signal, or a second format comprising the first type of modulated signal and a second type of modulated signal that is different than the first type. The modulated signal is decoded by determining a frequency shift amount based on the format of the modulated signal, shifting a frequency band of the first type of modulated signal from an original position to a shifted position, thereby shifting a center frequency of the first type of modulated signal by the frequency shift amount, and filtering, based on the format of the modulated signal, signals outside of the frequency band of the shifted first type of modulated signal.

16 Claims, 4 Drawing Sheets

(51) Int. Cl.
*H04W 72/04* (2009.01)
*H04J 4/00* (2006.01)
*H04L 27/156* (2006.01)

(52) U.S. Cl.
CPC ...... *H04L 27/0008* (2013.01); *H04L 27/0014* (2013.01); *H04L 27/1563* (2013.01); *H04L 27/26* (2013.01); *H04W 72/0446* (2013.01); *H04B 7/2615* (2013.01); *H04L 27/38* (2013.01)

(58) Field of Classification Search
CPC ... H04L 27/1563; H04L 27/265; H04L 25/02; H04L 27/0014; H04L 27/26; H04L 27/38; H04J 4/00; H04W 72/0446; H04W 72/0453
USPC ....... 375/229, 232, 260, 262, 265, 340, 343, 375/346, 350; 370/208, 210, 335, 337, 370/342, 344
See application file for complete search history.

(56) References Cited

U.S. PATENT DOCUMENTS

| | | | |
|---|---|---|---|
| 6,785,513 B1* | 8/2004 | Sivaprakasam | H04B 7/0617 455/11.1 |
| 6,928,046 B1* | 8/2005 | Sajadieh | H04L 27/2656 370/203 |
| 7,085,315 B1* | 8/2006 | Kelton | H04L 25/03159 375/219 |
| 9,237,040 B1* | 1/2016 | Jin | H04L 25/03343 |
| 2004/0246890 A1 | 12/2004 | Marchok et al. | |
| 2006/0239338 A1 | 10/2006 | Kolanek et al. | |
| 2007/0183541 A1 | 8/2007 | Moorti et al. | |
| 2014/0044214 A1 | 2/2014 | Gossmann et al. | |
| 2014/0169406 A1 | 6/2014 | Hadani et al. | |
| 2014/0177620 A1* | 6/2014 | Montreuil | H04L 27/01 370/347 |
| 2016/0072578 A1* | 3/2016 | Jin | H04J 14/086 398/36 |

* cited by examiner

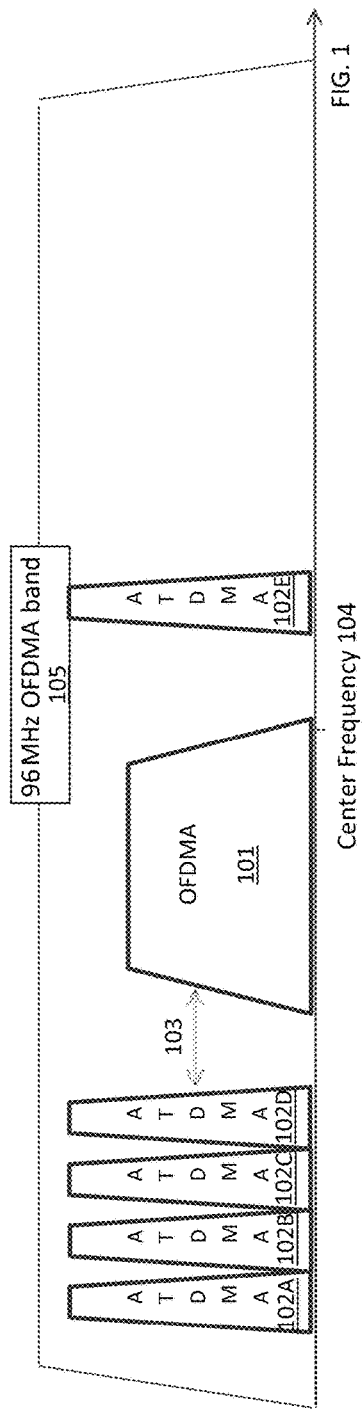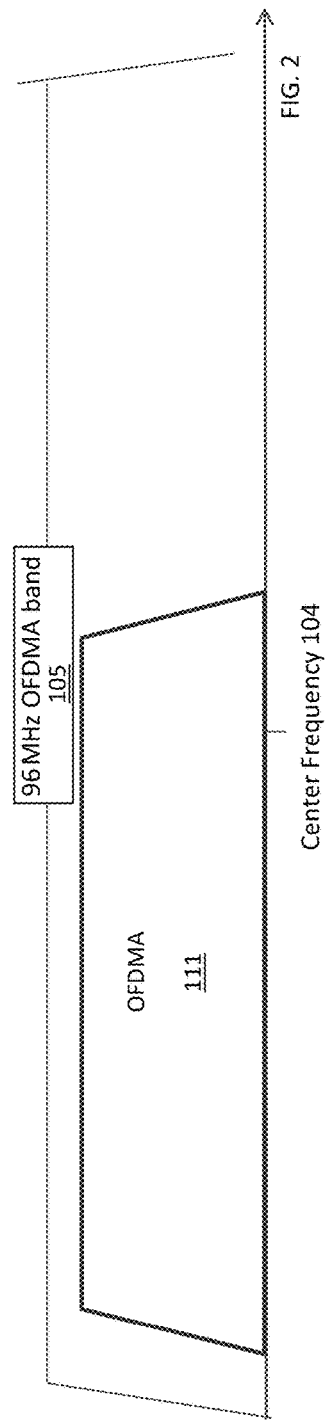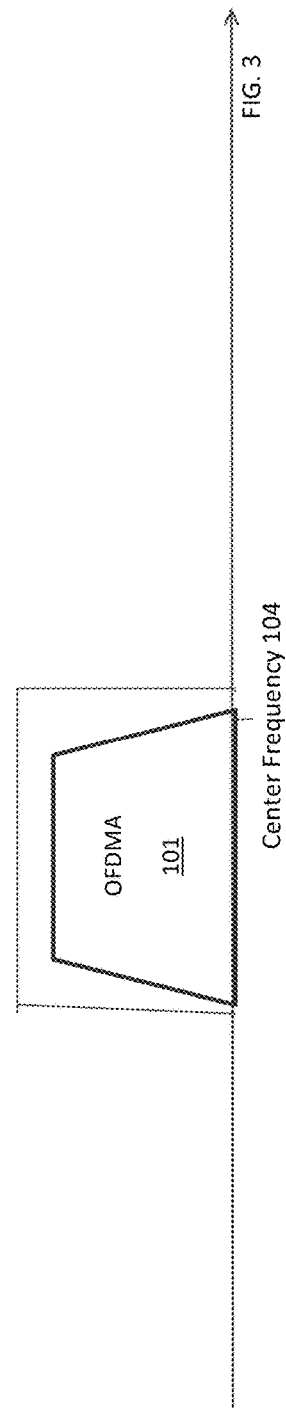

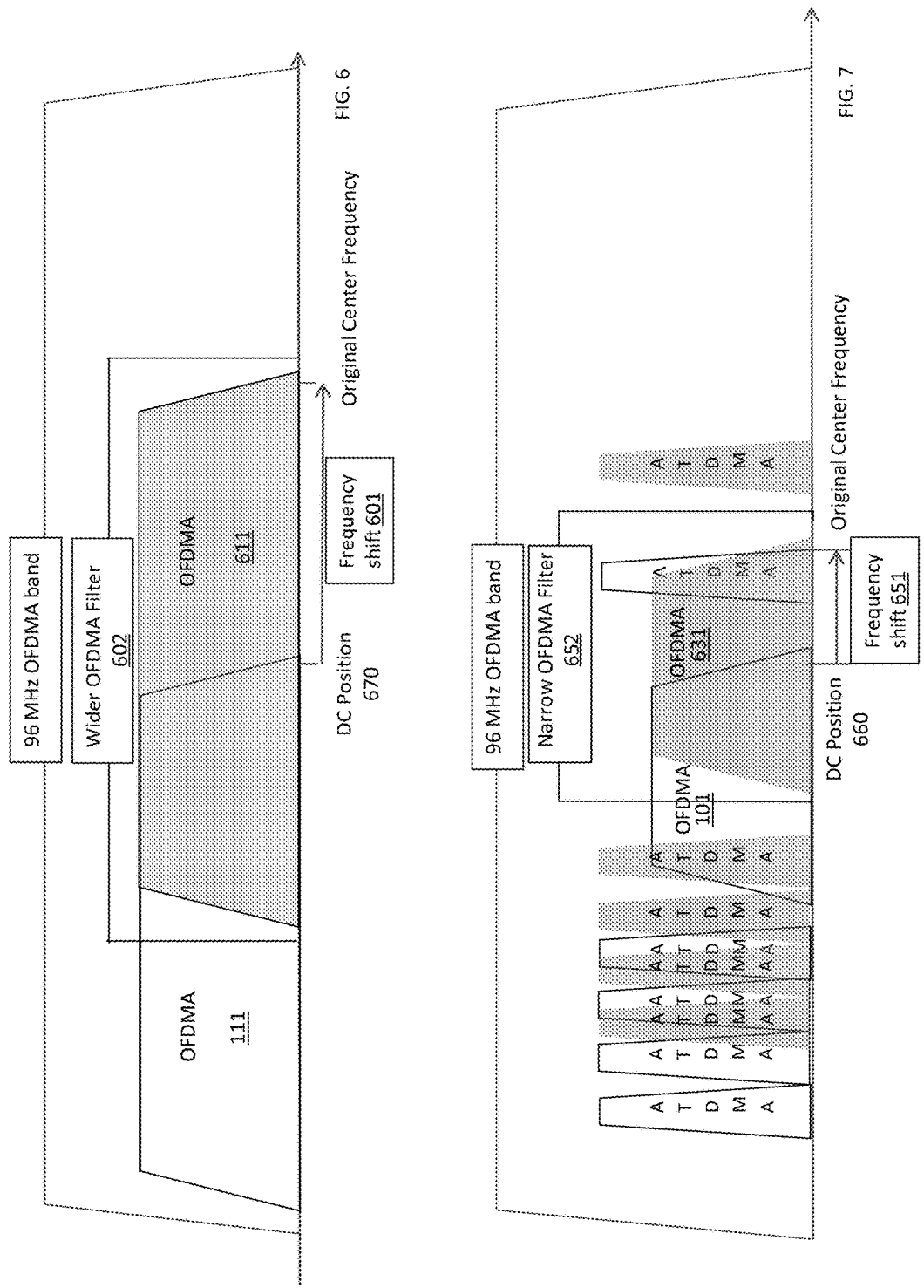

DYNAMIC SHARING OF OFDMA AND ATDMA SIGNALS

RELATED APPLICATIONS

This application claims priority under 35 U.S.C. § 119(e) to U.S. Provisional Application Ser. No. 62/468,713, entitled "DYNAMIC SHARING OF OFDMA AND ATDMA SIGNALS" filed on Mar. 8, 2017, which is herein incorporated by reference in its entirety.

TECHNICAL FIELD

The present disclosure relates to dynamic sharing of Orthogonal Frequency-Division Multiple Access (OFDMA) and Advanced Time Division Multiple Access (ATDMA) signals, and in particular the implementation of orthogonal frequency division multiplexing (OFDM) technology for cable upstream data transfer in Data Over Cable Service Interface Specification (DOCSIS).

BACKGROUND

Various standards are used in the industry for cable data transfer. For example, DOCSIS 3.1 is the new standard for Data-Over-Cable Service and the first to implement OFDM technology for cable upstream data transfer. Legacy Advanced Time Division Multiple Access (ATDMA) signals under DOCSIS 3.0 may remain deployed in the same cable plants for a very long time. The frequency band allowed for upstream is very limited. If a fixed bandwidth for Orthogonal Frequency-Division Multiple Access (OFDMA) is assigned in the early stages of deployment, such an OFDMA frequency band may be wasted if there are few DOCSIS 3.1 users. In the later stages of deployment, the ATDMA frequency band may be wasted if most of the users have moved to DOCSIS 3.1 modems.

In order to achieve better efficiency, ATDMA/OFDMA bands can be scheduled dynamically. However, field tests and simulations have shown that if the OFDMA fast Fourier transform (FFT) is performed on the combined signals, the ATDMA signal may have significant spectral spread on each side of it in the frequency domain due to a rectangular window function applied to OFDMA FFT. This can make a region on each side of the ATDMA signal unusable for OFDMA carriers. Some proposed approaches use extra band-pass filters to get the expected signal and narrow the guard band, but none of them change the mixer frequency to move the expected signal to the center of baseband dynamically.

SUMMARY

In accordance with the disclosed subject matter, apparatus, systems, and methods are provided for decoder-side motion vector restoration techniques that improve the execution speed and efficiency of decoder-side motion vector refinement techniques.

Some embodiments relate to a decoding method for decoding modulated data. The method includes receiving a modulated signal, determining a format of the modulated signal, wherein the format comprises either a first format comprising a first type of modulated signal, or a second format comprising the first type of modulated signal and a second type of modulated signal that is different than the first type, and decoding the modulated signal. Decoding includes determining a frequency shift amount based on the format of the modulated signal, shifting a frequency band of the first type of modulated signal from an original position to a shifted position, thereby shifting a center frequency of the first type of modulated signal by the frequency shift amount, and filtering, based on the format of the modulated signal, signals outside of the frequency band of the shifted first type of modulated signal.

In some examples, filtering includes determining a set of filtering coefficients for the modulated signal based on whether the modulated signal comprises the first format or the second format, and filtering the modulated signal using the set of filtering coefficients. The method can include transforming the shifted first type of modulated signal from the frequency domain, equalizing the transformed first type of modulated signal to generate an equalized signal, and shifting the equalized signal back to the original position.

In some examples, the first type of signal comprises an Orthogonal Frequency-Division Multiple Access (OFDMA) signal, and the second type of data comprises Advanced Time Division Multiple Access (ATDMA) signal. Determining whether the modulated signal comprises the first format or the second format includes receiving scheduling information from a scheduler, and determining, using the scheduling information, whether the modulated signal comprises the first format or the second format. The modulated signal can be received on a frame-by-frame basis. Decoding the modulated signal can include determining, for each frame, whether the frame comprises the first format or the second format, and decoding each frame based on the determination, thereby allowing each frame dynamically change between the first format and the second format.

Some embodiments relate to an apparatus for decoding modulated data. The apparatus includes a receiver configured to receive a modulated signal. The apparatus includes a decoder with a mixer and a filter. The decoder is configured to determine a format of the modulated signal, wherein the format comprises either a first format comprising a first type of modulated signal, or a second format comprising the first type of modulated signal and a second type of modulated signal that is different than the first type. The decoder decodes the modulated signal, including determining a frequency shift amount based on the format of the modulated signal, shifting, using a mixer, a frequency band of the first type of modulated signal from an original position to a shifted position, thereby shifting a center frequency of the first type of modulated signal by the frequency shift amount, and filtering, using a filter that takes into account the format of the modulated signal, signals outside of the frequency band of the shifted first type of modulated signal.

In some examples, the decoder is configured to perform the filtering by determining a set of filtering coefficients for the modulated signal based on whether the modulated signal comprises the first format or the second format, and filtering, using the filter, the modulated signal using the set of filtering coefficients. The decoder can include a fast Fourier transform (FFT) module configured to transform the shifted first type of modulated signal from the frequency domain, an equalizer in communication with the FFT module, configured to equalize the transformed first type of modulated signal to generate an equalized signal, and a shift register in communication with the equalizer configured to shift the equalized signal back to the original position.

In some examples, the first type of signal comprises an Orthogonal Frequency-Division Multiple Access (OFDMA) signal, and the second type of data comprises Advanced Time Division Multiple Access (ATDMA) signal. The receiver can be configured to determine whether the modulated signal comprises the first format or the second format by receiving scheduling information from a scheduler, and determining, using the scheduling information, whether the modulated signal comprises the first format or the second format. The receiver can receive the modulated signal on a frame-by-frame basis, and the decoder can be configured to decode the modulated signal by determining, for each frame, whether the frame comprises the first format or the second format, and to decode each frame based on the determination, thereby allowing each frame dynamically change between the first format and the second format.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

FIG. 1 shows a typical ATDMA and OFDMA combined signals in the frequency domain.

FIG. 2 shows typical OFDMA signals in the frequency domain when the entire frequency band is assigned to the OFDMA.

FIG. 3 shows a clean OFDMA signal after applying a bandpass filter on the combined signal from FIG. 1.

FIG. 6 shows an OFMDA-only signal, according to some embodiments.

FIG. 7 shows an OFDMA and ATDMA combined signal, according to some embodiments.

DESCRIPTION

Figure 4:
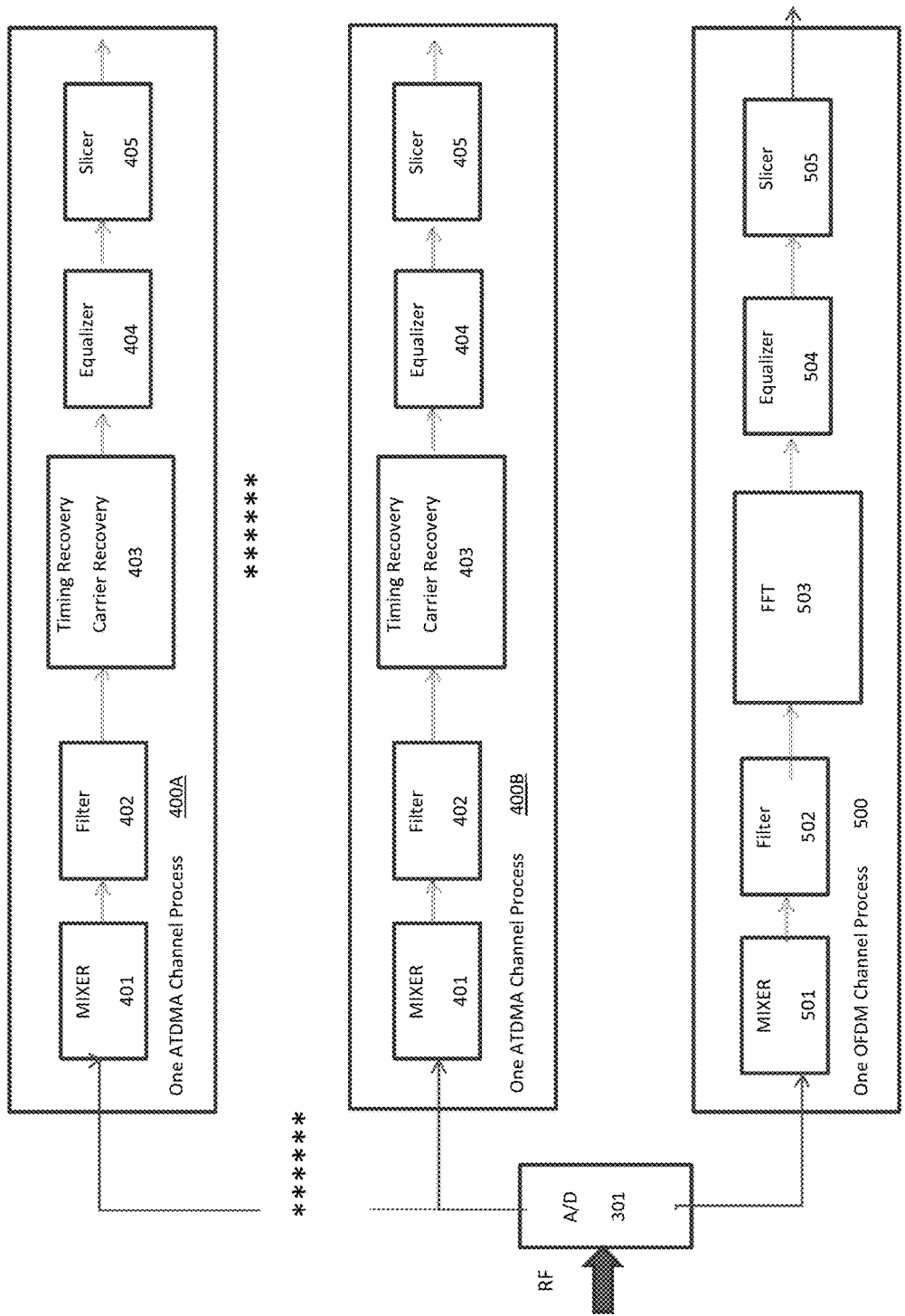
FIG. 4 shows an exemplary ATDMA and OFDMA receiver system.

The inventors have recognized and appreciated that various techniques can be used to improve dynamically sharing OFDMA and ATDMA signals. As described further herein, techniques are provided for dynamically decoding OFDMA signals based on the format of the modulated data (e.g., pure OFDMA, or OFDMA and ATDMA). A frequency shift is determined based on the format of the modulated data, and used to shift the center frequency of the OFDMA signal. The OFDMA signal is filtered using filtering coefficients that are determined based on the format of the modulated data to remove signals outside of the OFDMA signal.

For example, from the cable modem termination system (CMTS) point of view, when OFDMA (DOCSIS 3.1) and ATDMA (e.g., DOCSIS 3.0 and/or older versions) signals share the plant at the same time, the CMTS processes these signals at same time. To reduce the interference in the OFDMA channel, a large exclusion zone and several filters are typically used. In some embodiments, the techniques described herein are based on a single symmetric finite impulse response (FIR) filter with two sets of filter coefficients for the OFDMA signal (instead of a 96 MHz bandwidth standard OFDMA filter). When ATDMA signals are not scheduled, the entire frequency band can be used by the OFDMA signal. In this case, the wider band filter coefficients are applied. When ATMDA signals are present, the OFDMA signal can only use part of the frequency band. In this case, the narrow band filter coefficients are applied. The switch can be scheduled at each OFMDA frame boundary on the fly. Instead of moving the center of the entire 96 MHz OFMDA frequency band to baseband as in the general case, the center of only the active OFDMA frequency range is moved to baseband. This can allow a simple FIR filter with symmetric coefficients to be used instead of a complex band-pass filter or multiple filters. This can also allow the CMTS to dynamically adjust to signals (e.g., combined OFDMA and ATDMA signals, or OFDMA across the entire frequency band) as they are received by the CMTS on a frame-by-frame basis, e.g., rather than the CMTS needing to reset each time the signal changes. These and other techniques disclosed herein can simplify the integration of DOCSIS 3.1 into existing DOCSIS (e.g., 3.0 or other versions) cable plants and can also improve the utilization rate of the frequency band and reduce system complexity.

FIG. 1 shows a typical example of ATDMA and OFDMA combined signals in the frequency domain, according to some examples. OFDMA signals 101 transmit data in each sub-carrier (not shown). The OFDMA bandwidth can be very flexible. For example, OFDMA bandwidth can be as small as 400 KHz or can be as large as 96 MHz. ATDMA signals 102A-102E (collectively referred to herein as ATDMA signals 102) transmit data using single carrier based quadrature amplitude modulation (QAM). The center frequency 104 for OFDMA can be, for example, 52 MHz. The total bandwidth is the 96 MHz OFDMA band 105. The CMTS typically needs to use different technologies to process ATDMA and OFDMA signals at the same time to recover data.

FIG. 2 shows the typical OFDMA signals in the frequency domain when the entire frequency band is assigned to the OFDMA signal 111, according to some examples. In this nonlimiting embodiment, compared to FIG. 1, the OFDMA signal 111 occupies a larger frequency band (e.g., 5 MHz to 65 MHz) compared to the OFDMA signal 101 frequency band (e.g., 30 MHz to 55 MHz).

FIG. 3 shows a clean OFDMA signal after properly applying a bandpass filter on the combined signal from FIG. 1, according to some examples. The filter removes the ATDMA signals 102 to produce just OFDMA signal 101.

FIG. 4 depicts an ATDMA and OFDMA receiver system, according to some embodiments. The RF signal goes into a full band high-speed analog to digital converter (ADC) 301. Once the analog signal is converted to the digital domain, the ATDMA and OFDMA signals are processed separately. FIG. 4 shows two ATDMA channel processes 400A, 400B (collectively referred to as 400), which illustrate the processing flow of two ATDMA channels through a typical ATDMA receiver system. The ATDMA receiver system includes mixer 401, which is configured to move selected ATDMA channels to baseband. A person of skill can appreciate that only two processing flows are illustrated for exemplary purposes only. The receiver may perform more (or fewer) processing flows for more (or fewer) ATDMA channels. Then FIR filter 402 is applied to separate a clean ATDMA signal from the OFDMA signals and adjacent ATDMA signals. The clean ATDMA signal then goes through timing recovery and carrier recovery 403. Time domain equalizer 404 reconstructs the QAM signal, and slicer 405 slices the data.

FIG. 4 also shows an exemplary OFDMA channel process 500 performed using an OFDMA receiver system. The OFDMA receiver system includes mixer 501, filter 502, FFT 503, equalizer 504, and slicer 505. These components are described in further detail in conjunction with FIG. 5. For illustrative purposes, assume that the center frequency for the OFDMA cable modem is ω (the center of the 96 MHz bandwidth). According to the DOCSIS standard, the center frequency ω should be the same for both CMTS and cable modem. The Mixer 501 can be configured to move the entire OFDMA channel to baseband (96 MHz bandwidth in DOCSIS 3.1). According to some embodiments, the output sequence of the mixer 501 $\{Y_{Mixer}{}^n\}$ can be:

$$Y_{501}{}^n = X_{301}{}^n * e^{-i\omega n} \quad (1)$$

Where:
n is the order of ADC samples;
i stands for complex data;
$\{X_{301}{}^n\}$ is the ADC input data sequence; and
ω is a local digital oscillator which will convert the $X_n$ signal to baseband (e.g., the OFDMA signal 101 in FIG. 1).

FIR filter 502 is applied to get a clean 96 MHz signal. In some embodiments, e.g., to obtain a smaller guard band in the combined signal case, an additional set of band-pass filters can optionally be applied to remove all ATDMA signals since the OFDMA signal is inside this pass band. We can consider that the FIR filters just introduce a several sample delay to sequence $\{Y_{501}{}^n\}$.

FFT module 503 converts the signal to the frequency domain. The FFT module 503 output is:

$$Y_{503}^k = \sum_{n=0}^{N-1} X_{502}^n * e^{-\frac{i2\pi kn}{N}} \text{ for } k = 0, 1, 2, \ldots, N-1 \quad (2)$$

Where:
$\{X_{502}{}^n\}$ is the input data sequence of FFT module 503;
N is FFT window size;
$\{Y_{503}{}^k\}$ is the FFT module output sequence;
n is the order of data; and
i stands for complex data.

If we ignore sample delay in the FIR filter 502, put (1) into (2). We get:

$$Y_{503}^k = \sum_{n=0}^{N-1} X_{301}^n * e^{i\omega n} * e^{-i2\pi kn/N} = \sum_{n=0}^{N-1} X_{301}^n * e^{-i\left(\omega + \frac{2\pi k}{N}\right)n} \quad (3)$$

$$k = 0, 1, 2, \ldots, N-1$$

When local oscillator frequency $$\omega = \frac{2\pi m}{N}$$

(m is a constant integer: 0≤m≤N−1), formula (3) changes to $$Y_{503}^k = \sum_{n=0}^{N-1} X_{301}^n * e^{-i\left(\frac{2\pi m}{N} + \frac{2\pi k}{N}\right)n} = \sum_{n=0}^{N-1} X_{301}^n * e^{-\frac{i2\pi(m+k)n}{N}} \quad (4)$$

$$k = 0, 1, 2, \ldots, N-1$$

If we apply an FFT to ADC data sequence $\{X_{301}{}^n\}$ directly, we can get:

$$Y_{503}^{\prime k} = \sum_{n=0}^{N-1} X_{301}^n * e^{-\frac{i2\pi kn}{N}} \quad k = 0, 1, 2, \ldots, N-1$$

Compare formula (4) and (5). If local oscillator frequency $$\omega = \frac{2\pi m}{N}$$

(where m is a constant integer 0≤m≤N−1), then mixer 501 just shifts the FFT output sequence $\{Y'_{503}{}^k\}$ by −m position to get new FFT output sequence $\{Y_{503}{}^k\}$.

FIG. 7 is shows an OFDMA and ATDMA combined signal, according to some embodiments. If the receiver moves the OFDMA signal with additional frequency shift 651, the center of OFDMA signal 101 will move to DC (e.g., 0 Hz) position 660. Then one simple symmetric FIR filter 652 can be applied to remove all ATDMA signals and out-of-band noise. If we add additional frequency shift $$\omega' = \frac{2\pi m_N}{N}$$

(N and $m_N$ are integers to make sure the frequency shift is multiple of 25 KHz/50 KHz.), then, based on the discussion above, the FFT output sequence $\{Y'_{503}{}^k\}$ will move an extra $-m_N$ position. If we add $-m_N$ as the shift amount in the future modules (for example, pilot positions and values in slicer/equalizer modules), moving the OFDMA signal back to the original baseband location (e.g., the original center frequency of the 96 MHZ band) may not be necessary.

FIG. 6 is an OFMDA-only signal, according to some embodiments. Similar to what was discussed in conjunction with FIG. 7, if the OFDMA signal is moved with additional frequency shift 601, the center of OFDMA signal 111 will move to DC position 670. Then one tap of the same coefficient sequence symmetric FIR filter with wider bandwidth (602) can be applied to remove all mirror signals and out-of-band noise. Similar to FIG. 7, we can get shift $-m_w$ for frequency shift 601.

Even though in the processing of FIG. 6 and FIGS. 7, 602 and 652 are different filters, the filters can have the same number of taps and share the same hardware logic with different coefficients.

Figure 5:
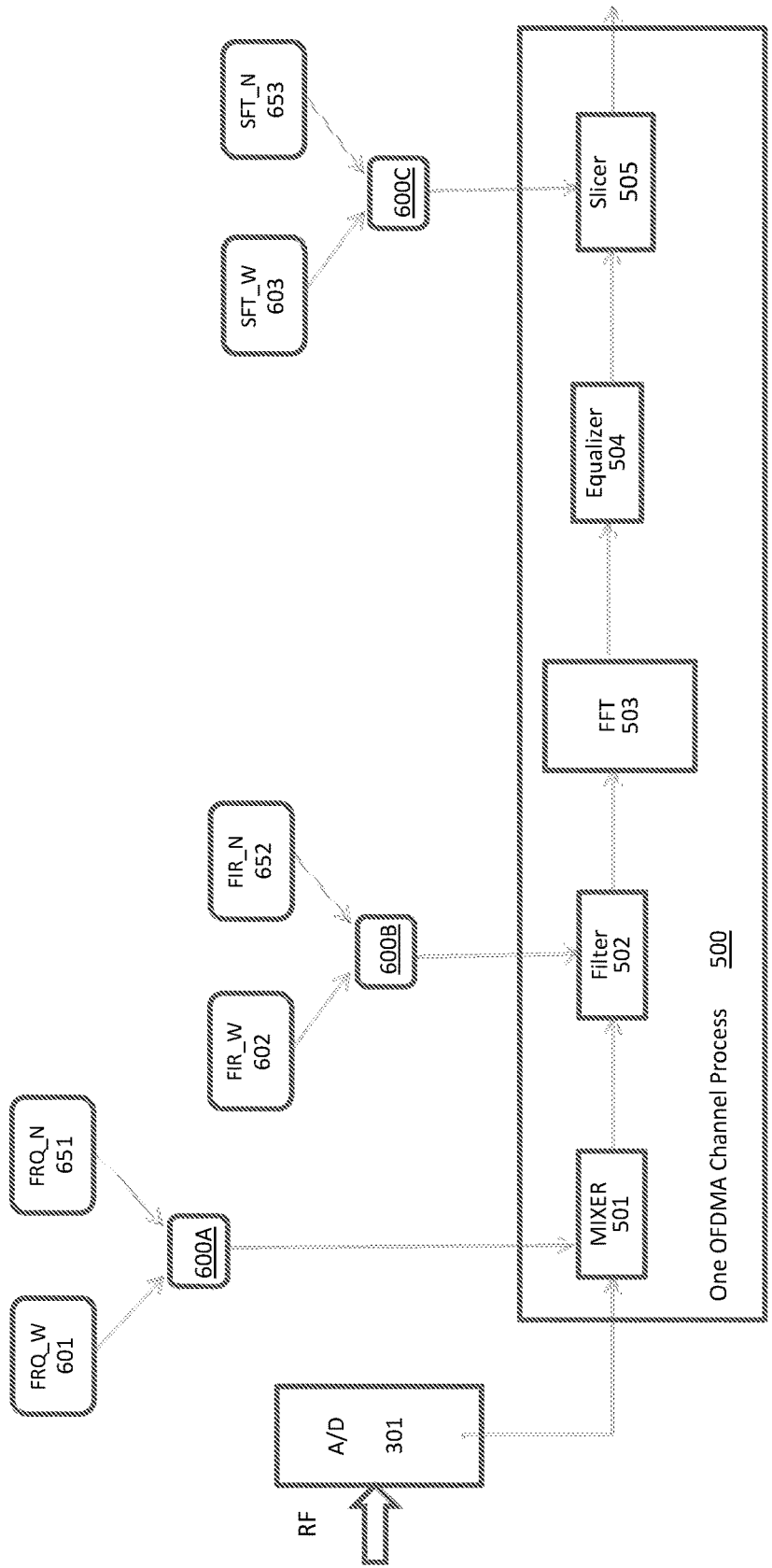
FIG. 5 shows an exemplary OFDMA receiver system, according to some embodiments.

FIG. 5 shows an example of combined processing for ATDMA/OFDMA signals, according to some embodiments. First, based on OFDMA active signal range (e.g., 101 in FIGS. 1 and 7, or 111 in FIGS. 2 and 6) and center frequency, the receiver calculates the frequency shift FRQ_W 651 or FRQ_N 601 (e.g., to move the center frequency) and oscillator frequency for the mixer 501. There are two shift values (SFT_W 653 and SFT_N 603) and two frequencies (FRQ_W 651 and FRQ_N 601), where "W" corresponds to the wider OFDM filter 602 in FIG. 6, and "N" corresponds to the narrow OFDMA filter 652. Second, based on the bandwidth of the shifted OFDMA signals (e.g., 611 in FIG. 6 or 631 in FIG. 7, essentially the same as 101/111), the receiver uses two low-pass symmetric FIR filters coefficients (FIR_W 602 and FIR_N 652 in FIG. 5) to remove all ATDMA signals and out-of-band noise.

Below are two nonlimiting examples of filter coefficients, one for a 20 MHz filter, and another for a 65 MHz filter:
20 MHz Filter Coefficients Set {462, 414, −194, −1709, −3800, −5387, −4930, −1155, 6105, 15462, 24263, 29606, 29606, 24263, 15462, 6105, −1155, −4930, −5387, −3800, −1709, −194, 414, 462};
65 MHz Filter Coefficients Set{−285, 1640, 2260, −2262, 90, 3852, −5076, −86, 9404, −13632, −237, 72246, 72246, −237, −13632, 9404, −86, −5076, 3852, 90, −2262, 2260, 1640, −285}, In some embodiments, the two sets of Filters have the same number of taps. Switching the coefficients allows the same Filter hardware to process a signal at different bandwidths.

In some embodiments, the receiver includes control switches 600A, 600B and 600C (collectively referred to as control switches 600) to change the working mode from the wide OFDMA filter to/from the narrow OFDMA filter. For example, when ATDMA signals appear, the bandwidth of OFDMA signal occupies a narrow bandwidth (e.g., 101 in FIGS. 1 and 7). The control switches 600 will apply FRQ_N 651, FIR_N 652, and SFT_N 653 to the system. The oscillator frequency FRQ_N 651 will move the center of the OFDMA signal to DC. Narrow band filter FIR_N 652 will remove all the signals outside the OFMDA signal. After FFT, shift register SFT_N 653 will move the FFT output to the original position.

As another example, when OFDMA occupies the ATDMA frequency range, the OFDMA signal occupies a wide bandwidth (e.g., 111 FIGS. 2 and 6). The switches 600 will apply FRQ_W 601, FIR_W 602, and SFT_W 603 to the system. The oscillator frequency FRQ_W 601 will move the center of the OFDMA signal to DC. Wide band filter FIR_W 602 will remove all the signals outside the OFMDA signal. After FFT, shift register SFT_W 603 will move the FFT output to the original position.

Since there is cyclic-prefix period between each frame for timing alignment, there are samples between each frame that may be dropped if the CMTS is able to stabilize the timing with the CM. For example, after performing an initial timing offset adjustment, the CMTS may be synchronized such that it receives data at the adjusted timing. In such examples, switch 600 can operate during the cyclic-prefix period at each OFDMA frame boundary on the fly. In some embodiments, the CMTS has a scheduler so that the CM knows how to decode the received signal (e.g., the CM can be configured frame-by-frame via the CMTS scheduler), and the CM can adjust the type of OFDMA filtering (e.g., using switches 600) similarly on a frame-by-frame basis.

The receiving device, as explained above, can be a cable modem (CM). In some embodiments, the CM can, for example, use the same dynamic mixer frequency and change the filter coefficient frame by frame, on the fly.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

The invention claimed is:

1. A decoding method for decoding a modulated signal, the method comprising:
   determining a format of the modulated signal, wherein the format comprises either:
      a first format comprising a first type of modulated signal; or
      a second format comprising the first type of modulated signal and a second type of modulated signal that is different than the first type of modulated signal; and
   decoding the modulated signal, comprising:
      determining a frequency shift amount based on the format of the modulated signal;
      shifting a frequency band of the first type of modulated signal or frequency bands of the first type of modulated signal and the second type of modulated signal from an original position to a shifted position, thereby shifting a center frequency of the first type of modulated signal by the frequency shift amount; and
      filtering, based on the first or second format of the modulated signal, signals outside of the frequency band of the shifted first type of modulated signal.

2. The decoding method of claim 1, wherein filtering comprises:
   determining a set of filtering coefficients for the modulated signal based on whether the modulated signal comprises the first format or the second format; and
   filtering the modulated signal using the set of filtering coefficients.

3. The decoding method of claim 1, further comprising:
   transforming the shifted first type of modulated signal from a frequency domain;
   equalizing the transformed first type of modulated signal to generate an equalized signal; and
   moving the equalized signal back to the original position.

4. The decoding method of claim 1, wherein:
   the first type of modulated signal comprises an Orthogonal Frequency-Division Multiple Access (OFDMA) signal; and
   the second type of modulated signal comprises an Advanced Time Division Multiple Access (ATDMA) signal.

5. The decoding method of claim 1, wherein determining whether the modulated signal comprises the first format or the second format comprises:
   receiving scheduling information; and
   determining, using the scheduling information, whether the modulated signal comprises the first format or the second format.

6. The decoding method of claim 1, wherein the modulated signal is received on a frame-by-frame basis, and decoding the modulated signal comprises:
   determining, for each frame, whether the frame comprises the first format or the second format; and
   decoding each frame based on the determination, thereby allowing each frame dynamically change between the first format and the second format.

7. The decoding method of claim 1, wherein:
   determining the format comprises determining the format is the first format, wherein the first type of modulated signal comprises a wide bandwidth compared to a narrower bandwidth that the first type of modulated signal occupies for the second format;
   determining the frequency shift amount comprises determining a frequency shift for the wide bandwidth; and
   filtering comprises filtering signals outside of a wide frequency band of the shifted first type of modulated signal.

8. The decoding method of claim 1, wherein:
   determining the format comprises determining the format is the second format, wherein the first type of modulated signal comprises a narrow bandwidth compared to a wider bandwidth that the first type of modulated signal occupies for the first format;
   determining the frequency shift amount comprises determining a frequency shift for the narrow bandwidth; and
   filtering comprises filtering signals outside of a narrow frequency band of the shifted first type of modulated signal.

9. An apparatus for decoding a modulated signal, the apparatus comprising:
   a decoder comprising a mixer and a filter, wherein the decoder is configured to:
      determine a format of the modulated signal, wherein the format comprises either:
         a first format comprising a first type of modulated signal; or
         a second format comprising the first type of modulated signal and a second type of modulated signal that is different than the first type of modulated signal; and
      decode the modulated signal, comprising:
         determining a frequency shift amount based on the format of the modulated signal;
         shifting, using the mixer, a frequency band of the first type of modulated signal or frequency bands of the first type of modulated signal and the second type of modulated signal from an original position to a shifted position, thereby shifting a center frequency of the first type of modulated signal by the frequency shift amount; and filtering, using the filter, which takes into account the first or second format of the modulated signal, signals outside of the frequency band of the shifted first type of modulated signal.

10. The apparatus of claim 9, wherein the decoder is configured to perform the filtering by:
    determining a set of filtering coefficients for the modulated signal based on whether the modulated signal comprises the first format or the second format; and
    filtering, using the filter, the modulated signal using the set of filtering coefficients.

11. The apparatus of claim 9, wherein the decoder further comprises:
    a fast Fourier transform (FFT) module configured to transform the shifted first type of modulated signal from a frequency domain;
    an equalizer in communication with the FFT module, configured to equalize the transformed first type of modulated signal to generate an equalized signal; and
    a shift register in communication with the equalizer, configured to move shift the equalized signal back to the original position.

12. The apparatus of claim 9, wherein:
    the first type of modulated signal comprises an Orthogonal Frequency-Division Multiple Access (OFDMA) signal; and
    the second type of modulated signal comprises an Advanced Time Division Multiple Access (ATDMA) signal.

13. The apparatus of claim 9, wherein the decoder is configured to determine whether the modulated signal comprises the first format or the second format by:
    receiving scheduling information; and
    determining, using the scheduling information, whether the modulated signal comprises the first format or the second format.

14. The apparatus of claim 9, wherein the decoder is configured to:
    decode the modulated signal by determining, for each frame of the modulated signal, whether the frame comprises the first format or the second format; and
    decode each frame based on the determination, thereby allowing each frame dynamically change between the first format and the second format.

15. The apparatus of claim 9, wherein:
    determining the format comprises determining the format is the first format, wherein the first type of modulated signal comprises a wide bandwidth compared to a narrower bandwidth that the first type of modulated signal occupies for the second format;
    determining the frequency shift amount comprises determining a frequency shift for the wide bandwidth; and
    filtering comprises filtering signals outside of a wide frequency band of the shifted first type of modulated signal.

16. The apparatus of claim 9, wherein:
    determining the format comprises determining the format is the second format, wherein the first type of modulated signal comprises a narrow bandwidth compared to a wider bandwidth that the first type of modulated signal occupies for the first format;
    determining the frequency shift amount comprises determining a frequency shift for the narrow bandwidth; and
    filtering comprises filtering signals outside of a narrow frequency band of the shifted first type of modulated signal.

* * * * *